(12) United States Patent
Liu (10) Patent No.: US 10,834,105 B2
(45) Date of Patent: Nov. 10, 2020

(54) METHOD AND APPARATUS FOR IDENTIFYING MALICIOUS WEBSITE, AND COMPUTER STORAGE MEDIUM

(71) Applicant: TENCENT TECHNOLOGY (SHENZHEN) COMPANY LIMITED, Shenzhen (CN)

(72) Inventor: Jian Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 96 days.

(21) Appl. No.: 15/967,232

(22) Filed: Apr. 30, 2018

(65) Prior Publication Data

US 2018/0248898 A1    Aug. 30, 2018

Related U.S. Application Data

(63) Continuation of application No. PCT/CN2017/078650, filed on Mar. 29, 2017.

(30) Foreign Application Priority Data

Mar. 29, 2016    (CN) .......................... 2016 1 0186975

(51) Int. Cl.
*H04L 29/06* (2006.01)
*G06F 16/951* (2019.01)
(Continued)

(52) U.S. Cl.
CPC ........ *H04L 63/1416* (2013.01); *G06F 16/951* (2019.01); *G06F 16/9558* (2019.01);
(Continued)

(58) Field of Classification Search
CPC ............. H04L 63/1416; H04L 63/1466; G06F 16/9566; G06F 21/554; G06F 21/56;
(Continued)

(56) References Cited

U.S. PATENT DOCUMENTS 7,865,953 B1 *    1/2011    Hsieh ................. G06F 21/566
                                                              726/22
8,474,048 B2    6/2013    Masood
(Continued)

FOREIGN PATENT DOCUMENTS

CN    102332028 A    1/2012
CN    102571768        7/2012
(Continued)

OTHER PUBLICATIONS

International Search Report dated Jun. 1, 2017 in PCT/CN2017/078650 filed Mar. 29, 2017. (With English Translation).
(Continued)

*Primary Examiner* — Mohammad W Reza
(74) *Attorney, Agent, or Firm* — Oblon, McClelland, Maier & Neustadt, L.L.P.

(57) ABSTRACT

This application discloses a method and an apparatus for identifying a malicious website, and belongs to the field of the Internet. An apparatus for identifying a malicious website includes interface circuitry and processing circuitry. The interface circuitry receives a request for querying whether a first website is of a malicious website type. The request carries first website information for the first website. The processing circuitry identifies, based on the first website information, whether the first website is of the malicious website type to obtain an identification result for the first website. Further, the processing circuitry obtains, a hyperlink from page content of the first website based on the identification result for the first website and performs an identification to identify whether a second website corresponding to the hyperlink is of the malicious website type.

21 Claims, 3 Drawing Sheets

(51) Int. Cl.
  *G06F 16/955* (2019.01)
  *G06F 21/56* (2013.01)
  *G06F 21/55* (2013.01)
(52) U.S. Cl.
  CPC ........ *G06F 16/9566* (2019.01); *G06F 21/554* (2013.01); *G06F 21/56* (2013.01); *H04L 63/1466* (2013.01)
(58) Field of Classification Search
  CPC .............. G06F 16/9558; G06F 16/951; G06F 2221/034; G06F 21/566
  USPC .......................................................... 726/23
  See application file for complete search history.

(56) References Cited

U.S. PATENT DOCUMENTS

| | | | | |
|---|---|---|---|---|
| 8,943,588 | B1* | 1/2015 | Speegle | H04L 63/1483 726/22 |
| 9,276,956 | B2* | 3/2016 | Geng | G06F 21/51 |
| 9,298,824 | B1* | 3/2016 | Vinnik | G06F 16/951 |
| 2015/0058986 | A1 | 2/2015 | Zhao et al. | |
| 2018/0041530 | A1* | 2/2018 | Tang | H04L 63/1483 |

FOREIGN PATENT DOCUMENTS

| CN | 102647417 | | 8/2012 |
|---|---|---|---|
| CN | 102833258 | | 12/2012 |
| CN | 103428183 | | 12/2013 |
| CN | 103530562 | A | 1/2014 |
| CN | 103701779 | | 4/2014 |
| CN | 103856442 | A | 6/2014 |
| CN | 103902889 | A | 7/2014 |
| CN | 104766014 | | 7/2015 |
| CN | 104811418 | A | 7/2015 |
| KR | 10-0704000 | | 3/2007 |
| KR | 10-2013-0032660 | | 4/2013 |

OTHER PUBLICATIONS

International Preliminary Report on Patentability dated Oct. 2, 2018 in PCT/CN2017/078650 filed Mar. 29, 2017. (With English Translation).

Written Opinion of the International Searching Authority dated Jun. 1, 2017 in PCT/CN2017/078650 filed Mar. 29, 2017. (With English Translation).

Office Action dated Sep. 4, 2019 in Korean Patent Application No. 10-2018-7014910.

Combined Office Action and Search Report dated Dec. 31, 2019 in Chinese Patent Application No. 201610186975.7 (with Concise English language translation).

Chinese Office Action Issued in Chinese Patent Application 201610186975.7 dated Oct. 9, 2019, with partial English Translation (12 pages).

* cited by examiner

METHOD AND APPARATUS FOR IDENTIFYING MALICIOUS WEBSITE, AND COMPUTER STORAGE MEDIUM

RELATED APPLICATION

This application is a continuation of International Application No. PCT/CN2017/078650, filed on Mar. 29, 2017, which claims priority to Chinese Patent Application No. 201610186975.7 filed on Mar. 29, 2016. The entire disclosures of the prior applications are hereby incorporated by reference in their entirety.

FIELD OF THE TECHNOLOGY

This application relates to identifying a malicious website.

BACKGROUND OF THE DISCLOSURE

The rapid development of Internet technologies makes people's life increasingly convenient. For example, people can download various data, shop online, or the like by using the Internet. Meanwhile, malicious behaviors such as disguising various Trojan horses as normal files for wanton spread, and stealing user accounts and passwords by simulating a normal website by a phishing website occur. Therefore, methods for identifying a malicious website draw much attention.

In related technologies, a cloud security server identifies a malicious website according to website information of a website. Therefore, when finding that particular website information is intercepted, a malicious person may conduct a malicious behavior by using new website information. In this case, an information database does not include a record of the new website information. Therefore, the cloud security server does not identify the website as a malicious website. To resolve the problem, the cloud security server needs to download page content of the website, and analyze the page content of the website. If the analysis result indicates that the website is a malicious website, the record of the new website information is stored in the information database, so that a website corresponding to the new website information can be identified as a malicious website next time.

However, for each new website that does not exist in the information database, the cloud security server needs to perform the operation of downloading page content and the operation of analyzing the page content, wasting a large quantity of bandwidth and processing resources, and consuming relatively long time, which is not beneficial to quickly and effectively identifying a malicious website.

SUMMARY

To resolve the problems of the related technology, this application provides a method and an apparatus for identifying a malicious website.

An apparatus for identifying a malicious website is provided. The apparatus includes interface circuitry and processing circuitry. The interface circuitry receives a request for querying whether a first website is of a malicious website type. The request carries first website information for the first website. The processing circuitry identifies, based on the first website information, whether the first website is of the malicious website type to obtain an identification result for the first website. Further, the processing circuitry obtains, a hyperlink from page content of the first website based on the identification result for the first website and performs an identification to identify whether a second website corresponding to the hyperlink is of the malicious website type.

In an embodiment, the processing circuitry determines a hyperlink start tag and a hyperlink end tag from the page content of the first website and extracts, from the page content of the first website, information between the hyperlink start tag and the hyperlink end tag to be the hyperlink.

According to an aspect of the disclosure, the processing circuitry obtains a specific link address of the second website from the hyperlink and determines whether the specific link address of the second website exists in a malicious information database. When the specific link address of the second website exists in the malicious information database, the processing circuitry determines that the second website corresponding to the hyperlink is of the malicious website type.

In an embodiment, when the specific link address of the second website does not exist in the malicious information database, the processing circuitry identifies, according to a preset condition, whether the second website corresponding to the hyperlink is a malicious website. In an example, the processing circuitry accesses a malicious link index database that associates a link address with malicious websites that cite the link address. Then, the processing circuitry obtains, from the malicious link index database, a number of third websites that cites the specific link address of the second website. When the number of the third websites is greater than a first preset value, the processing circuitry determines that the second website is of the malicious website type.

In another example, the processing circuitry accesses a malicious link index database that associates a link address with malicious websites that cite the link address, and context words to the link address in the malicious websites. Further, the processing circuitry obtains, from the malicious link index database, a number of a specific context word that appears in the malicious websites with the specific link address of the second website. When the number of the specific context words is greater than a second preset value, the processing circuitry determines that the second website is of the malicious website type.

In an embodiment, when the second website is of the malicious website type, the processing circuitry stores the specific link address of the second website into the malicious information database. In another embodiment, when the second website is not of the malicious website type and the first website is of the malicious website type, the processing circuitry stores the specific link address of the second website in association with the first website information, and context words to the specific link address in the page content of the first website information in a malicious link index database.

Aspects of the disclosure provide a method for identifying a malicious website. The method includes receiving a request for querying whether a first website is of a malicious website type. The request carries first website information for the first website. Further, the method includes identifying, based on the first website information, whether the first website is of the malicious website type to obtain an identification result for the first website. Based on the identification result for the first website, the method includes obtaining, by the processing circuitry of the server device, a hyperlink from page content of the first website, and performing, by the processing circuitry of the server device, an identification to identify whether a second website corresponding to the hyperlink is of the malicious website type.

In some embodiments, a non-transitory computer-readable storage medium stores instructions for identifying a malicious website. When the instructions are executed by a processor, the processor performs the method of identifying a malicious website.

The technical solutions provided in this application bring the following beneficial effects: In this application, a first website is identified based on first website information and when receiving a malicious website query request, and at least one piece of hyperlink information is obtained from page content of the first website, so as to separately perform, based on the at least one piece of hyperlink information, identification on a second website linked to the at least one piece of hyperlink information. That is, the second website linked to the hyperlink information in the page content of the first website can further be identified when the first website can be identified, thereby improving the efficiency of identifying a malicious website.

BRIEF DESCRIPTION OF THE DRAWINGS

To describe the technical solutions in this application more clearly, the following briefly describes the accompanying drawings required for describing the embodiments. The accompanying drawings in the following descriptions show merely some embodiments of this application, and a person of ordinary skill in the art may still derive other drawings from these accompanying drawings.

DESCRIPTION OF EMBODIMENTS

To make the objectives, technical solutions, and advantages of this application clearer, the following further describes the implementations of this application in detail with reference to the accompanying drawings.

Before this application is explained and described in detail, an application scenario of this application is first introduced. When a user downloads various data and shops online by using the Internet, various Trojan horses and phishing websites may possibly steal user information such as user accounts and passwords, harming the security of the user information. In related technologies, for each piece of website information that does not exist in an information database, the cloud security server needs to download page content of a website corresponding to the website information, and analyze the page content of the website, reducing the efficiency of identifying a malicious website. Therefore, this application provides a method for identifying a malicious website, so that bandwidths and processing resources can be saved, and the efficiency of identifying a malicious website can be improved.

Figure 1:
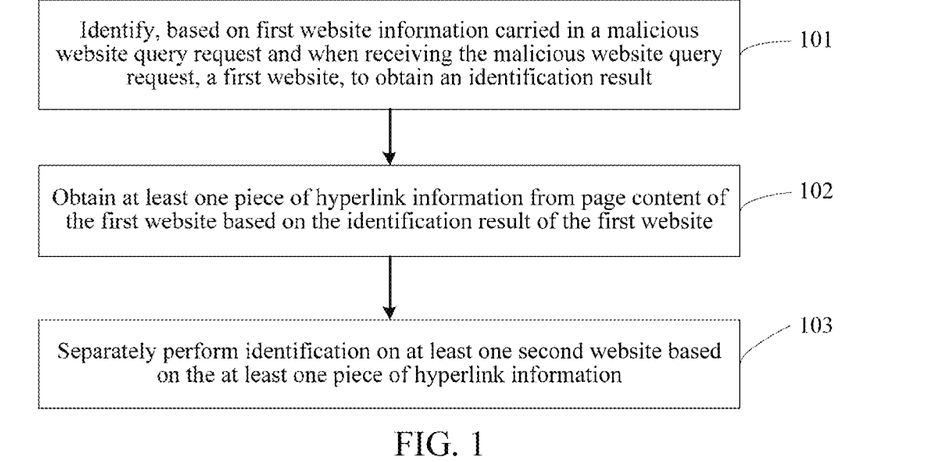
FIG. 1 is a flowchart of a method for identifying a malicious website according to this application.

FIG. 1 is a flowchart of a method for identifying a malicious website according to this application. Referring to FIG. 1, the method includes:

Step 101: Identify, based on first website information carried in a malicious website query request and when receiving the malicious website query request, a first website, to obtain an identification result, the first website information being website information of the first website.

Step 102: Obtain at least one piece of hyperlink information from page content of the first website based on the identification result of the first website.

Step 103: Separately perform identification on at least one second website based on the at least one piece of hyperlink information, the at least one second website being a website respectively linked to the at least one piece of hyperlink information.

In this application, a first website is identified based on first website information and when receiving a malicious website query request, and at least one piece of hyperlink information is obtained from page content of the first website, so as to separately perform, based on the at least one piece of hyperlink information, identification on a second website linked to the at least one piece of hyperlink information. That is, the second website linked to the hyperlink information in the page content of the first website can further be identified when the first website can be identified, thereby improving the efficiency of identifying a malicious website.

Optionally, the obtaining at least one piece of hyperlink information from page content of the first website includes:

obtaining at least one hyperlink start tag and at least one hyperlink end tag from the page content of the first website; and determining, in the page content of the first website, a target hyperlink start tag, a target hyperlink end tag, and information between the target hyperlink start tag and the target hyperlink end tag as hyperlink information, where the target hyperlink start tag is any hyperlink start tag in the at least one hyperlink start tag, and the target hyperlink end tag is corresponding to the target hyperlink start tag.

Optionally, the separately performing identification on at least one second website based on the at least one piece of hyperlink information includes:

for each piece of hyperlink information in the at least one piece of hyperlink information, obtaining link address information from the hyperlink information;

determining whether the link address information exists in a stored malicious information database; and when the link address information exists in the malicious information database, determining a second website linked to the hyperlink information as a malicious website.

Optionally, after the determining whether the link address information exists in a stored information database, the method further includes:

when the link address information does not exist in the information database, identifying, according to a preset condition, the second website linked to the hyperlink information.

Optionally, the identifying, according to a preset condition, the second website linked to the hyperlink information includes:

obtaining a quantity of pieces of third website information from a stored malicious link index database, where the third website information is website information of a third website, and the link address information is cited by the third website; and when the quantity of pieces of third website information is greater than a first preset value, determining the second website as a malicious website.

Optionally, the identifying, according to a preset condition, the second website linked to the hyperlink information includes:

obtaining, from a stored malicious link index database, a quantity of specific words included in first context information, where the first context information is text information that is located in a same display area as the link address information and in page content of a third website; and when the quantity of specific words is greater than a second preset value, determining the second website as a malicious website.

Optionally, after the separately performing identification on at least one second website based on the at least one piece of hyperlink information, the method further includes:

for any second website in the at least one second website, when the second website is a malicious website, storing link address information corresponding to the second website into the malicious information database.

Optionally, after the separately performing identification on at least one second website based on the at least one piece of hyperlink information, the method further includes:

for any second website in the at least one second website, when the second website is not a malicious website and the first website is a malicious website, storing link address information corresponding to the second website, the first website information, and second context information into the malicious link index database, where the second context information is text information that is located in a same display area as the link address information corresponding to the second website and that is in the page content of the first website.

All the foregoing optional technical solutions may be combined in any manner to form optional embodiments of this application. Details are not described in this application.

Figure 2:
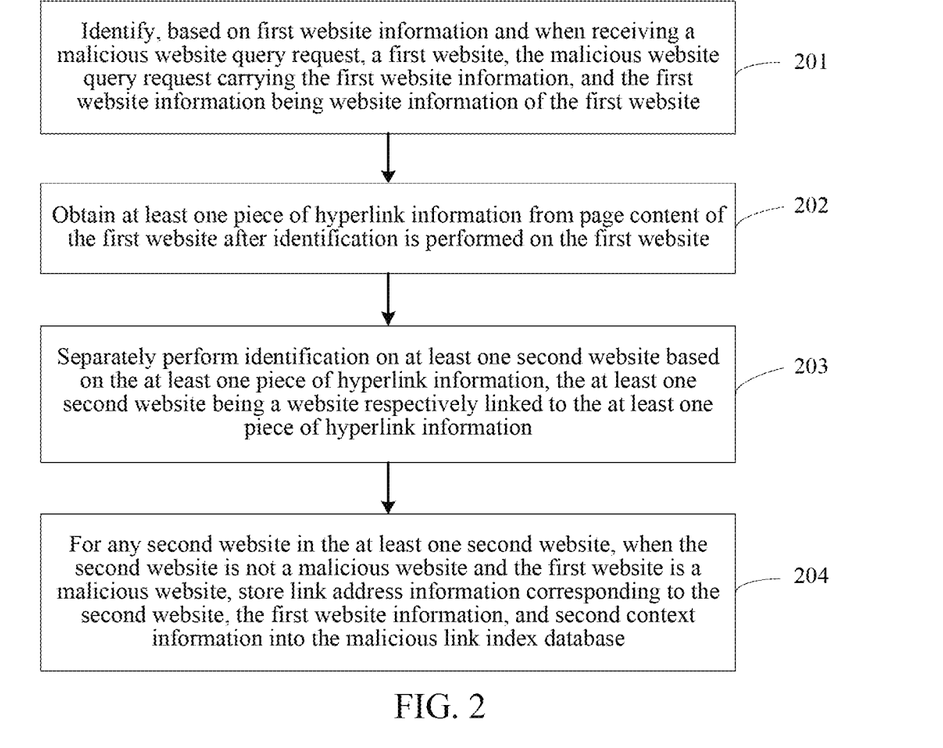
FIG. 2 is a flowchart of another method for identifying a malicious website according to this application.

FIG. 2 is a flowchart of another method for identifying a malicious website according to this application. Referring to FIG. 2, the method for identifying a malicious website is applied to a server, and includes:

Step 201: Identify, based on first website information and when receiving a malicious website query request, a first website, the malicious website query request carrying the first website information, and the first website information being website information of the first website.

When a user downloads various data and shops online by using the Internet, various Trojan horses and phishing websites may possibly steal user information such as user accounts and passwords, harming the security of the user information. Therefore, to protect the security of the user information, the server may identify the first website based on the first website information and when receiving the malicious website query request sent by a terminal.

The terminal may be a device that can access the Internet such as a mobile phone or a computer. The terminal may send the malicious website query request to the server when accessing the first website or when the user enters the first website information. Certainly, in actual application, the terminal may alternatively send the malicious website query request to the server on other occasions. This is not specifically limited in this application.

It is noted that the first website information may be an Internet Protocol (IP) address, or a domain name address. Certainly, in actual application, the first website information may alternatively be another address. This is not specifically limited in this application.

Further, when the server performs identification on the first website based on the first website information, whether the first website information exists in a stored malicious information database of the server may be determined. When the first website information exists in the malicious information database, the first website is identified as a malicious website. When the first website information does not exist in the malicious information database, page content of the first website is downloaded, so as to identify the first website according to the page content of the first website.

The malicious information database may be stored by the server before the server receives the malicious website query request. The malicious information database may include a plurality of pieces of malicious website information. As shown in the following Table 1, website information 1, website information 2, website information 3, and the like are all malicious website information.

TABLE 1

| Website information 1 |
| Website information 2 |
| Website information 3 |
| ... |

It is noted that in this application, the plurality of pieces of malicious website information included in the malicious information database shown in the foregoing Table 1 are used as an example for description. The foregoing Table 1 does not constitute a limitation to this application.

It should further be noted that when the server performs identification on the first website according to the page content of the first website, whether a specific word is included in the page content of the first website may be determined. When the specific word appears, the first website is identified as a malicious website. In addition, reference may further be made to the related technology for the method for identifying, by the server, the first website according to the page content of the first website. Details are not described in this application.

For example, when the server receives a malicious website query request 1, and the malicious website query request carries the website information 1, the server determines that the website information 1 exists in the malicious information database of the foregoing Table 1, and therefore the server identifies a first website 1 corresponding to the website information 1 as a malicious website. When the server receives a malicious website query request 2, and the malicious website query request carries website information 4, the server determines that the website information 4 does not exist in the malicious information database of the foregoing Table 1, and therefore the server downloads page content of a first website 2 corresponding to the website information, so as to identify the first website 2 according to the page content of the first website 2.

Step 202: Obtain at least one piece of hyperlink information from page content of the first website after identification is performed on the first website.

The page content of the first website usually further includes hyperlink information in addition to content such as pictures and text. The user may access, by using the hyperlink information, a website linked to the hyperlink information. If the website linked to the hyperlink information is a malicious website, the security of the user information is also harmed. Therefore, to identify the website linked to the hyperlink information to further ensure the security of the user information, after identification is performed on the first website, at least one piece of hyperlink information may be obtained from the page content of the first website.

It is noted that as can be learned from the foregoing description, when the first website information exists in the malicious information database, the server can also identify the first website as a malicious website without downloading the page content of the first website. Therefore, after identifying the first website as a malicious website according to the malicious information database, the server may alternatively download the page content corresponding to the first website, so as to identify the website linked to the hyperlink information included in the page content of the first website.

Further, the operation of obtaining at least one piece of hyperlink information from page content of the first website may be: obtaining at least one hyperlink start tag and at least one hyperlink end tag from the page content of the first website; and determining, in the page content of the first website, a target hyperlink start tag, a target hyperlink end tag, and information between the target hyperlink start tag and the target hyperlink end tag as hyperlink information, where the target hyperlink start tag is any hyperlink start tag in the at least one hyperlink start tag, and the target hyperlink end tag is corresponding to the target hyperlink start tag.

The hyperlink start tag and the hyperlink end tag corresponding to the hyperlink start tag are used to describe that the hyperlink start tag, the hyperlink end tag, and content between the hyperlink start tag and the hyperlink end tag corresponding to the hyperlink start tag are the hyperlink information. For example, the hyperlink start tag may be <a a plurality of tag attributes>, and the hyperlink end tag may be </a>. Certainly, in actual application, the hyperlink start tag and the hyperlink end tag may alternatively be represented in other forms. This is not specifically limited in this application.

It is noted that to accurately describe the hyperlink information, the hyperlink start tag may include a plurality of tag attributes. For example, a target attribute is used to describe a manner of opening the website linked to the hyperlink information, and a hypertext reference (href) attribute is used to describe link address information of the website linked to the hyperlink information. Certainly, in actual application, the plurality of tag attributes may further include other attributes. This is not specifically limited in this application.

It should further be noted that in addition to the foregoing method, reference may further be made to the related technology for the operation of obtaining at least one piece of hyperlink information from page content of the first website. Details are not described in this application.

For example, when the hyperlink start tag is <a target="target attribute value" href="href attribute value">, the hyperlink end tag is </a>, and the page content of the first website 1 is "<li<a target="_blank"href="www.123.com">this is a 123 network</a></li>", the server obtains <a target="_blank" href="www.123.com">, </a>, and content "<a target="_blank" href="www.123.com">this is a 123 network</a>" between <a target="_blank" href="www.123.com"> and </a> as hyperlink information 1.

Further, as can be learned from the foregoing description, the hyperlink start tag usually includes the link address information of the website linked to the hyperlink information. Therefore, to improve the efficiency of obtaining the hyperlink information, the server may obtain the hyperlink start tag, and further determine the obtained hyperlink start tag as the hyperlink information.

Step 203: Separately perform identification on at least one second website based on the at least one piece of hyperlink information, the at least one second website being a website respectively linked to the at least one piece of hyperlink information.

As can be learned from the foregoing description, the user may access, by using the hyperlink information, the website linked to the hyperlink information. However, when the website linked to the hyperlink information is a malicious website, the malicious website may harm the security of the user information. Therefore, to improve the efficiency of identifying a malicious website, identification may further be separately performed on the at least one second website based on the at least one piece of hyperlink information after identification is performed on the first website.

The operation of separately performing identification on at least one second website based on the at least one piece of hyperlink information may be: for each piece of hyperlink information in the at least one piece of hyperlink information, obtaining link address information from the hyperlink information; determining whether the link address information exists in a stored malicious information database; and when the link address information exists in the malicious information database, determining a second website linked to the hyperlink information as a malicious website.

It is noted that when including the link address information, the hyperlink information may possibly include other information such as a link address description. The link address information is website information corresponding to the second website, and the other information is used to describe the link address information.

It should further be noted that the link address information may be an IP address, or a domain name address. Certainly, in actual application, the link address information may alternatively be another address. This is not specifically limited in this application.

For example, in the hyperlink information 1 "<a href="www.123.com">this is a 123 network</a>", "www.123.com" is the link address information corresponding to the second website, and "this is a 123 network" is a link address description for describing the link address information.

Further, after whether the link address information exists in the stored malicious information database is determined, when the link address information does not exist in the malicious information database, the second website linked to the hyperlink information may further be identified according to a preset condition.

The operation of identifying, according to the preset condition, the second website linked to the hyperlink information may include the following two manners.

The first manner is obtaining a quantity of pieces of third website information from a stored malicious link index database, where the third website information is website information of a third website, and the link address information is cited by the third website, and when the quantity of pieces of third website information is greater than a first preset value, determining the second website as a malicious website.

The third website is a malicious website. The third website information may be an IP address, or a domain name address. Certainly, in actual application, the third website information may alternatively be another address. This is not specifically limited in this application.

It is noted that the malicious link index database includes at least the third website information and the link address information that is cited by the third website. Certainly, in actual application, to improve the accuracy of identifying whether the second website is a malicious website, the malicious link index database may further include other content. For example, to indicate a type to which the third website belongs, the malicious link index database may further include a third website type. This is not specifically limited in this application.

It should further be noted that when citing the link address information, the third website usually cites link address information of a website whose type is the same as that of the third website. When a plurality of malicious websites all cite the link address information, the second website may possibly be a malicious website. For example, when a lottery type website is a malicious website, and when a plurality of lottery type websites all cite the link address information, the second website may possibly be a lottery type website, and therefore the second website may possibly be a malicious website. Therefore, to improve the accuracy of identifying whether the second website is a malicious website, the server may obtain, from the stored malicious link index database, the quantity of pieces of third website information that cites the link address information. When the quantity of pieces of third website information is greater than the first preset value, the second website is determined as a malicious website.

Further, before obtaining the quantity of pieces of third website information, the server may set the first preset value according to needs of actual application. For example, the first preset value may be set to 2. Certainly, the first preset value may alternatively be another value. This is not specifically limited in this application.

For example, when the first preset value is 2 and the server obtains link address information 1 from the hyperlink information, the server obtains, from the malicious link index database shown in the following Table 2, that the quantity of pieces of third website information that cites the link address information 1 is 3, determines that the quantity 3 of pieces of third website information is greater than the first preset value 2, and therefore, determines a second website 1 corresponding to the link address information 1 as a malicious website.

TABLE 2

| Link address information | Third website information |
|---|---|
| Link address information 1 | Third website information 1 |
| Link address information 1 | Third website information 2 |
| Link address information 1 | Third website information 3 |
| Link address information 2 | Third website information 4 |
| Link address information 3 | Third website information 2 |
| Link address information 3 | Third website information 5 |
| ... | ... |

It is noted that in this application, the link address information and the third website information that are included in the malicious link index database shown in the foregoing Table 2 are used as an example for description. The foregoing Table 2 does not constitute a limitation to this application.

Further, before obtaining the quantity of pieces of third website information, the server may store the third website information corresponding to the third website that has been identified as a malicious website and the link address information cited by the third website into the malicious link index database.

Further, after the quantity of pieces of third website information is greater than the first preset value and the second website is determined as a malicious website, the link address information may further be stored into the malicious information database. When the server needs to perform identification on the second website again, the server may identify the second website as a malicious website according to the link address information in the malicious information database, thereby improving the efficiency of identifying a malicious website.

In addition, when the first website is identified in step 201, the quantity of pieces of the third website information that cites the first website information may alternatively be obtained from the malicious link index database in the foregoing manner. When the obtained quantity of pieces of the third website information is greater than the first preset value, the first website is identified as a malicious website.

The second manner is obtaining, from the stored malicious link index database, a quantity of specific words included in first context information, and when the quantity of specific words is greater than a second preset value, determining the second website as a malicious website.

When the third website cites the link address information, the link address information is usually described or the type of the second website is usually described by using text information located in a same display area as the link address information. Therefore, to improve the accuracy of identifying whether the second website is a malicious website, the malicious link index database may further include the first context information, which is the text information that is located in the same display area as the link address information and in page content of the third website. Therefore, the server may obtain, from the stored malicious link index database, the quantity of specific words included in the first context information, and further determine the second website as a malicious website when the quantity of specific words is greater than the second preset value.

It is noted that before obtaining the first context information, the server may set the second preset value according to needs of actual application. For example, the second preset value may be 3. Certainly, the second preset value may alternatively be another value. This is not specifically limited in this application.

For example, when the second preset value is 3, the specific word is "lottery", and the server obtains the link address information 1 from the hyperlink information, the server obtains, from the malicious link index database shown in the following Table 3, that the quantity of specific words included in the first context information is 4, determines that the quantity 4 of specific words is greater than the second preset value 3, and therefore, determines the second website as a malicious website.

TABLE 3

| Link address information | Third website information | First context information |
|---|---|---|
| Link address information 1 | Third website information 1 | Lottery, geography |
| Link address information 1 | Third website information 2 | Lottery |
| Link address information 1 | Third website information 3 | Lottery, lottery |
| Link address information 2 | Third website information 4 | Education, science |
| Link address information 3 | Third website information 2 | Astronomy, news |
| Link address information 3 | Third website information 5 | Encyclopaedia |
| ... | ... | |

It is noted that in this application, the link address information, the third website information, and the first context information that are included in the malicious link index database shown in the foregoing Table 3 are used as an example for description. The foregoing Table 3 does not constitute a limitation to this application.

Further, before obtaining the quantity of specific words included in the first context information, the server may store the third website information corresponding to the third website that has been identified as a malicious website, the link address information cited by the third website, and the first context information into the malicious link index database.

In addition, the server may identify, in other manners and according to the preset condition, the second website linked to the hyperlink information. For example, the server may synchronously obtain, from the stored malicious link index database, the quantity of pieces of third website information and the quantity of specific words included in the first context information, and identify the second website as a malicious website when the quantity of pieces (entries) of third website information is greater than the first preset value and the quantity of specific words is greater than the second preset value. This is not specifically limited in this application.

Step 204: For any second website in the at least one second website, when the second website is not a malicious website and the first website is a malicious website, store link address information corresponding to the second website, the first website information, and second context information into the malicious link index database.

When the first website is a malicious website, the second website cited by the first website may possibly also be a malicious website. Therefore, to further improve the accuracy of identifying whether the second website is a malicious website, when the server identifies the first website as a malicious website by using step 201 to step 203, but does not identify the second website as a malicious website, the server may store the link address information corresponding to the second website, the first website information, and the second context information into the malicious link index database. Subsequently, when the server performs identification again on a website that cites the link address information corresponding to the second website, the server may further perform further identification on the second website, to determine whether the second website is a malicious website.

It is noted that the second context information is text information that is located in a same display area as the link address information corresponding to the second website and in the page content of the first website.

In addition, when the server performs identification on the first website and any second website in the at least one second website, in addition to the foregoing result, that is, identifying the first website as a malicious website without identifying the second website as a malicious website, the following three results may possibly be included: the first result: identifying both the first website and the second website as malicious websites; the second result: identifying the second website as a malicious website, and identifying the first website as a non-malicious website; and the third result: identifying both the first website and the second website as non-malicious websites.

It is noted that after the server performs identification on the first website and any second website in the at least one second website, the server should further store the first website or the second website identified as a malicious website into the malicious information database. Specifically, for the first result, the server may store both the first website information and the link address information that is corresponding to the second website into the malicious information data base. For the second result, the server may store the link address information corresponding to the second website into the malicious information database result. For the third result, the server may not store the first website information and the link address information that is corresponding to the second website.

In this application, a first website is identified based on first website information and when receiving a malicious website query request, and at least one piece of hyperlink information is obtained from page content of the first website, so as to separately perform, based on the at least one piece of hyperlink information, identification on a second website linked to the at least one piece of hyperlink information. That is, the second website linked to the hyperlink information in the page content of the first website can further be identified when the first website can be identified, thereby improving the efficiency of identifying a malicious website. In addition, when identifying the second website, the server does not need to download page content of the second website. Instead, the server selects different preset conditions according to different needs of actual application, to identify the second website based on data in the stored malicious information database and data in the stored malicious link index database, so that not only the efficiency of identifying a malicious website is improved, but also the flexibility of identifying a malicious website is improved.

Figure 3:
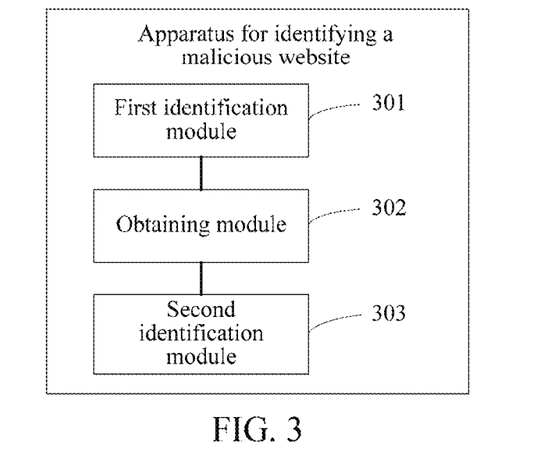
FIG. 3 is a schematic structural diagram of an apparatus for identifying a malicious website according to this application.

FIG. 3 is a schematic diagram of an apparatus for identifying a malicious website according to this application. Referring to FIG. 3, the apparatus includes a first identification module 301, an obtaining module 302, and a second identification module 303.

The first identification module 301 is configured to identify, based on first website information and when receiving a malicious website query request, a first website, the malicious website query request carrying the first website information, and the first website information being website information of the first website.

The obtaining module 302 is configured to obtain at least one piece of hyperlink information from page content of the first website after identification is performed on the first website.

The second identification module 303 is configured to separately perform identification on at least one second website based on the at least one piece of hyperlink information, the at least one second website being a website respectively linked to the at least one piece of hyperlink information.

Optionally, the obtaining module includes:

a first obtaining unit, configured to obtain at least one hyperlink start tag and at least one hyperlink end tag from the page content of the first website; and a first determining unit, configured to determine, in the page content of the first website, a target hyperlink start tag, a target hyperlink end tag, and information between the target hyperlink start tag and the target hyperlink end tag as hyperlink information, where the target hyperlink start tag is any hyperlink start tag in the at least one hyperlink start tag, and the target hyperlink end tag is corresponding to the target hyperlink start tag.

Optionally, the second identification module includes:

a second obtaining unit, configured to: for each piece of hyperlink information in the at least one piece of hyperlink information, obtain link address information from the hyperlink information;

a judgment unit, configured to determine whether the link address information exists in a stored malicious information database; and a second determining unit, configured to: when the link address information exists in the malicious information database, determine a second website linked to the hyperlink information as a malicious website.

Optionally, the second identification module further includes:

an identification unit, configured to: when the link address information does not exist in the information database, identify, according to a preset condition, the second website linked to the hyperlink information.

Optionally, the identification unit includes:

a first obtaining subunit, configured to obtain a quantity of pieces of third website information from a stored malicious link index database, where the third website information is website information of a third website, and the link address information is cited by the third website; and a first determining subunit, configured to: when the quantity of pieces of third website information is greater than a first preset value, determine the second website as a malicious website.

Optionally, the identification unit includes:

a second obtaining subunit, configured to obtain, from a stored malicious link index database, a quantity of specific words included in first context information, where the first context information is text information that is located in a same display area as the link address information and in page content of a third website; and a second determining subunit, configured to: when the quantity of specific words is greater than a second preset value, determine the second website as a malicious website.

Optionally, the apparatus further includes:

a first storage module, configured to: for any second website in the at least one second website, when the second website is a malicious website, store link address information corresponding to the second website into the malicious information database.

Optionally, the apparatus further includes:

a second storage module, configured to: for any second website in the at least one second website, when the second website is not a malicious website and the first website is a malicious website, store link address information corresponding to the second website, the first website information, and second context information into the malicious link index database, where the second context information is text information that is located in a same display area as the link address information corresponding to the second website and that is in the page content of the first website.

Based on the above, in this application, a first website is identified based on first website information and when receiving a malicious website query request, and at least one piece of hyperlink information is obtained from page content of the first website, so as to separately perform, based on the at least one piece of hyperlink information, identification on a second website linked to the at least one piece of hyperlink information. That is, the second website linked to the hyperlink information in the page content of the first website can further be identified when the first website can be identified, thereby improving the efficiency of identifying a malicious website.

With respect to the apparatus in the foregoing embodiment, specific manners of performing operations by the modules have been described in detail in embodiments related to the method, and are not described in detail herein.

Figure 4:
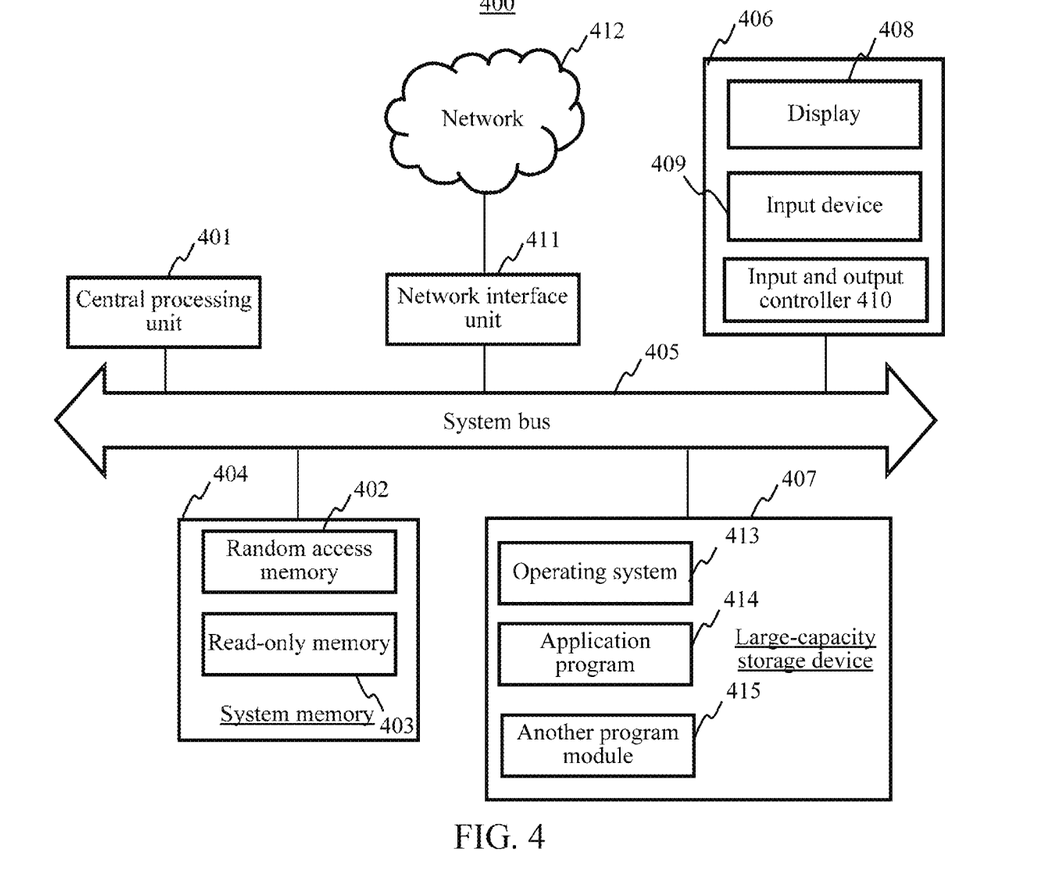
FIG. 4 is a schematic structural diagram of another apparatus for identifying a malicious website according to this application.

FIG. 4 is a schematic structural diagram of another apparatus for identifying a malicious website according to an embodiment of this application. The apparatus may be a server, and the server may be a server in a background server cluster. Referring to FIG. 4, specifically:

The server 400 includes a central processing unit (CPU) 401, a system memory 404 including a random access memory (RAM) 402 and a read-only memory (ROM) 403, and a system bus 405 connecting the system memory 404 to the CPU 401. The server 400 further includes a basic input/output system (I/O system) 406 assisting in transmitting information between devices in a computer, and a large-capacity storage device 407 configured to store an operating system 413, an application program 414 and another program module 415.

The basic I/O system 406 includes a display 408 configured to display information and an input device 409, such as a mouse or a keyboard, configured to input information by a user. The display 408 and the input device 409 are both connected to the CPU 401 by using an input and output controller 410 connected to the system bus 405. The basic I/O system 406 may further include the input and output controller 410 for receiving and processing inputs from a plurality of other devices such as a keyboard, a mouse, and an electronic stylus. Similarly, the input and output controller 410 further provides an output to a display screen, a printer or another type of output device.

The large-capacity storage device 407 is connected to the CPU 401 by using a large-capacity storage controller (not shown) connected to the system bus 405. The large-capacity storage device 407 and its associated computer readable medium provide non-volatile storage for the server 400. That is, the large-capacity storage device 407 may include a computer readable medium (not shown) such as a hard disk or a CD-ROM driver.

Without loss of generality, the computer readable medium may include a computer storage medium and a communications medium. The computer storage medium includes volatile and non-volatile, movable and unmovable media implemented by using any method or technology and configured to store information such as a computer readable instruction, a data structure, a program module, or other data. The computer storage medium includes a RAM, a ROM, an EPROM, an EEPROM, a flash memory, or another solid-state storage technology, and a CD-ROM, a DVD, or another optical storage, and a cassette, a tape, magnetic storage, or another magnetic storage device. Certainly, a person skilled in the art may learn that the computer storage medium is not limited to the foregoing types. The system memory 404 and the large-capacity storage device 407 may be generally referred to as a memory.

According to various embodiments of this application, the server 400 may further be connected, by using a network such as the Internet, to a remote computer on the network and run. That is, the server 400 may be connected to a network 412 by using a network interface unit 411 connected to the system bus 405, or may be connected to another type of network or remote computer system (not shown) by using the network interface unit 411.

The memory further includes one or more programs, which are stored in the memory and are configured to be executed by the CPU. The one or more programs include instructions for performing the following method for identifying a malicious website provided in this application, including:

identifying, based on first website information and when receiving a malicious website query request, a first website, the malicious website query request carrying the first website information, and the first website information being website information of the first website;

obtaining at least one piece of hyperlink information from page content of the first website after identification is performed on the first website; and separately performing identification on at least one second website based on the at least one piece of hyperlink information, the at least one second website being a website respectively linked to the at least one piece of hyperlink information.

Optionally, the obtaining at least one piece of hyperlink information from page content of the first website includes:

obtaining at least one hyperlink start tag and at least one hyperlink end tag from the page content of the first website; and determining, in the page content of the first website, a target hyperlink start tag, a target hyperlink end tag, and information between the target hyperlink start tag and the target hyperlink end tag as hyperlink information, where the target hyperlink start tag is any hyperlink start tag in the at least one hyperlink start tag, and the target hyperlink end tag is corresponding to the target hyperlink start tag.

Optionally, the separately performing identification on at least one second website based on the at least one piece of hyperlink information includes:

for each piece of hyperlink information in the at least one piece of hyperlink information, obtaining link address information from the hyperlink information;

determining whether the link address information exists in a stored malicious information database; and when the link address information exists in the malicious information database, determining a second website linked to the hyperlink information as a malicious website.

Optionally, after the determining whether the link address information exists in a stored information database, the method further includes:

when the link address information does not exist in the information database, identifying, according to a preset condition, the second website linked to the hyperlink information.

Optionally, the identifying, according to a preset condition, the second website linked to the hyperlink information includes:

obtaining a quantity of pieces of third website information from a stored malicious link index database, where the third website information is website information of a third website, and the link address information is cited by the third website; and when the quantity of pieces of third website information is greater than a first preset value, determining the second website as a malicious website.

Optionally, the identifying, according to a preset condition, the second website linked to the hyperlink information includes:

obtaining, from a stored malicious link index database, a quantity of specific words included in first context information, where the first context information is text information that is located in a same display area as the link address information and in page content of a third website; and when the quantity of specific words is greater than a second preset value, determining the second website as a malicious website.

Optionally, after the separately performing identification on at least one second website based on the at least one piece of hyperlink information, the method further includes:

for any second website in the at least one second website, when the second website is a malicious website, storing link address information corresponding to the second website into the malicious information database.

Optionally, after the separately performing identification on at least one second website based on the at least one piece of hyperlink information, the method further includes:

for any second website in the at least one second website, when the second website is not a malicious website and the first website is a malicious website, storing link address information corresponding to the second website, the first website information, and second context information into the malicious link index database, where the second context information is text information that is located in a same display area as the link address information corresponding to the second website and that is in the page content of the first website.

In this application, a first website is identified based on first website information and when receiving a malicious website query request, and at least one piece of hyperlink information is obtained from page content of the first website, so as to separately perform, based on the at least one piece of hyperlink information, identification on a second website linked to the at least one piece of hyperlink information. That is, the second website linked to the hyperlink information in the page content of the first website can further be identified when the first website can be identified, thereby improving the efficiency of identifying a malicious website.

It is noted that the above functional modules are described for exemplary purposes when the apparatus for identifying a malicious website provided in the foregoing embodiment identifies a malicious website. In actual application, the functions may be allocated to different functional modules according to needs, which means that the internal structure of the apparatus is divided to different functional modules to complete all or some of the above described functions. In addition, the apparatus for identifying a malicious website provided in the foregoing embodiment is based on the same concept as the embodiments of the method for identifying a malicious website. For the specific implementation process, refer to the method embodiments, and the details are not described herein again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely exemplary embodiments of this application, and are not intended to limit this application. Any modification, equivalent replacement, improvement and the like made within the spirit and principle of this application should fall within the protection scope of this application.

Figure 5:
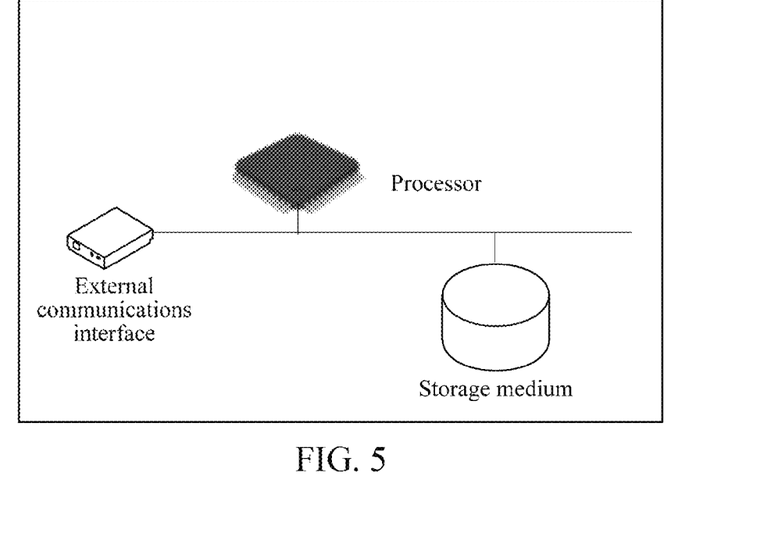
FIG. 5 is a schematic structural diagram of hardware composition of this application.

Based on the foregoing scenario, as an instance of a hardware entity, the apparatus provided in this embodiment is shown in FIG. 5, and includes a processor, a storage medium, and at least one external communications interface. The processor, the storage medium, and the external communications interface are all connected by using a bus.

The processor of the apparatus of this application performs the following processing:

identifying, based on first website information carried in a malicious website query request and when receiving the malicious website query request, a first website, to obtain an identification result, the first website information being website information of the first website;

obtaining at least one piece of hyperlink information from page content of the first website based on the identification result of the first website; and separately performing identification on at least one second website based on the at least one piece of hyperlink information, the at least one second website being a website respectively linked to the at least one piece of hyperlink information.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person of ordinary skill in the art may understand that all or some of the processes in the methods of the foregoing embodiments may be implemented by a computer program instructing relevant hardware. The program may be stored in a computer readable storage medium. For example, in this application, the program may be stored in a storage medium of a computer system, and is executed by at least one processor in the computer system, to implement the process including the foregoing method embodiments. The storage medium may be a magnetic disk, an optical disc, a ROM, a RAM, or the like.

Various technical features in the foregoing embodiments may be combined randomly. For ease of description, possible combinations of various technical features in the foregoing embodiments are not all described. However, the combinations of the technical features should be considered as falling within the scope recorded in this specification provided that the combinations of the technical features are compatible with each other.

The foregoing embodiments describe several implementation manners of this application, and their description is specific and detailed, but cannot therefore be understood as a limitation to the patent scope of the present disclosure. It should be noted that a person of ordinary skill in the art may further make variations and improvements without departing from the conception of this application, and these all fall within the protection scope of this application. Therefore, the patent protection scope of this application should be subject to the appended claims.

What is claimed is:

1. A method for identifying a malicious website, comprising:

receiving, by interface circuitry of a server, a request for querying whether a first website is of a malicious website type, the request carrying first website information for the first website;

determining, by processing circuitry of the server and based on the first website information, whether the first website is of the malicious website type to obtain a determination result for the first website;

obtaining, by the processing circuitry of the server, hyperlink information of a second website from page content of the first website based on the determination result for the first website, the hyperlink information of the second website including link address information and a link address description of the link address information; and performing, by the processing circuitry of the server, an identification to determine whether the second website corresponding to the hyperlink information is of the malicious website type based on the link address information, the link address description included in the hyperlink information, and a number of previously identified malicious websites that include the link address information.

2. The method according to claim 1, wherein the obtaining the hyperlink information from the page content of the first website comprises:

determining a hyperlink information start tag and a hyperlink information end tag from the page content of the first website; and extracting, from the page content of the first website, the hyperlink information from between the hyperlink information start tag and the hyperlink information end tag.

3. The method according to claim 1, wherein the performing the identification to determine whether the second website corresponding to the hyperlink information is of the malicious website type comprises:

obtaining a specific link address of the second website from the link address information;

determining whether the specific link address exists in a malicious information database; and when the specific link address exists in the malicious information database, determining the second website corresponding to the hyperlink information as of the malicious website type.

4. The method according to claim 3, wherein after the determining whether the specific link address of the second website exists in the malicious information database, the method further comprises:

when the specific link address does not exist in the malicious information database, determining, according to a preset condition, whether the second website corresponding to the hyperlink information is of the malicious website type.

5. The method according to claim 4, wherein the determining, according to the preset condition, whether the second website corresponding to the hyperlink information is of the malicious website type comprises:

accessing a malicious link index database that associates the specific link address with malicious websites that cite the specific link address;

obtaining, from the malicious link index database, the number of the previously identified malicious websites that cite the specific link address; and when the number of the previously identified malicious websites is greater than a first preset value, determining that the second website is of the malicious website type.

6. The method according to claim 4, wherein the determining, according to the preset condition, whether the second website corresponding to the hyperlink information is of the malicious website type comprises:

accessing a malicious link index database that associates the specific link address with context words and malicious websites that cite the specific link address;

obtaining, from the malicious link index database, a number of specific context words that appears in the malicious websites with the specific link address of the second website; and when the number of the specific context words is greater than a second preset value, determining that the second website is of the malicious website type.

7. The method according to claim 3, wherein after the performing the identification to determine whether the second website corresponding to the hyperlink information is of the malicious website type, the method further comprises:
when the second website is of the malicious website type, storing the specific link address of the second website into the malicious information database.

8. The method according to claim 3, wherein after the performing the identification to determine whether the second website corresponding to the hyperlink information is of the malicious website type, the method further comprises:
when the second website is not of the malicious website type and the first website is of the malicious website type, storing the specific link address of the second website in association with the first website information, and context words of the link address description in the page content of the first website information in a malicious link index database.

9. The method according to claim 1, wherein the link address information includes a hyperlink address and the link address description is displayed on the second website in association with the hyperlink address.

10. An apparatus for identifying a malicious website, comprising:
interface circuitry configured to receive a request for querying whether a first website is of a malicious website type, the request carrying first website information for the first website; and
processing circuitry configured to:
determine, based on the first website information, whether the first website is of the malicious website type to obtain a determination result for the first website;
obtain, hyperlink information of a second website from page content of the first website based on the determination result for the first website, the hyperlink information of the second website including link address information and a link address description of the link address information; and
perform an identification to determine whether the second website corresponding to the hyperlink information is of the malicious website type based on the link address information, the link address description included in the hyperlink information, and a number of previously identified malicious websites that include the link address information.

11. The apparatus according to claim 10, wherein the processing circuitry is configured to:
determine a hyperlink information start tag and a hyperlink information end tag from the page content of the first website; and
extract, from the page content of the first website, the hyperlink information from between the hyperlink information start tag and the hyperlink information end tag.

12. The apparatus according to claim 10, wherein the processing circuitry is configured to:
obtain a specific link address of the second website from the hyperlink information;
determine whether the specific link address exists in a malicious information database; and
when the specific link address exists in the malicious information database, determine that the second website corresponding to the hyperlink information is of the malicious website type.

13. The apparatus according to claim 12, wherein the processing circuitry is configured to:
when the specific link address does not exist in the malicious information database, determine, according to a preset condition, whether the second website corresponding to the hyperlink information is of the malicious website type.

14. The apparatus according to claim 13, wherein the processing circuitry is configured to:
access a malicious link index database that associates the specific link address with malicious websites that cite the specific link address;
obtain, from the malicious link index database, the number of the previously identified malicious websites that cites the specific link address of the second website; and
when the number of the previously identified malicious websites is greater than a first preset value, determine that the second website is of the malicious website type.

15. The apparatus according to claim 13, wherein the processing circuitry is configured to:
access a malicious link index database that associates the specific link address with context words and malicious websites that cite the specific link address;
obtain, from the malicious link index database, a number of a specific context words that appears in the malicious websites with the specific link address of the second website; and
when the number of the specific context words is greater than a second preset value, determine that the second website is of the malicious website type.

16. The apparatus according to claim 12, wherein the processing circuitry is configured to:
when the second website is of the malicious website type, store the specific link address of the second website into the malicious information database.

17. The apparatus according to claim 12, wherein the processing circuitry is configured to:
when the second website is not of the malicious website type and the first website is of the malicious website type, store the specific link address of the second website in association with the first website information, and context words of the link address description in the page content of the first website information in a malicious link index database.

18. A non-transitory computer-readable storage medium storing instructions which when executed by at least one processor cause the at least one processor to perform operations of identifying a malicious website, the operations comprising:
receiving a request for querying whether a first website is of a malicious website type, the request carrying first website information for the first website;
determining, based on the first website information, whether the first website is of the malicious website type to obtain a determination result for the first website;
obtaining hyperlink information of a second website from page content of the first website based on the determination result for the first website, the hyperlink information of the second website including link address information and a link address description of the link address information; and
performing an identification to determine whether the second website corresponding to the hyperlink information is of the malicious website type based on the link address information, the link address description included in the hyperlink information, and a number of previously identified malicious websites that include the link address information.

19. The non-transitory computer-readable storage medium of claim 18, wherein the operations further comprise:
   obtaining a specific link address from the hyperlink information;
   determining whether the specific link address exists in a malicious information database; and
   when the specific link address exists in the malicious information database, determining that the second website corresponding to the hyperlink information is of the malicious website type.

20. The non-transitory computer-readable storage medium of claim 19, wherein the operations further comprise:
   when the specific link address does not exist in the malicious information database,
   accessing a malicious link index database that associates the specific link address with malicious websites that cite the specific link address;
   obtaining, from the malicious link index database, the number of the previously identified malicious websites that cites the specific link address of the second website; and
   when the number of the previously identified malicious websites is greater than a first preset value, determining that the second website is of the malicious website type.

21. The non-transitory computer-readable storage medium of claim 19, wherein the operations further comprise:
   when the specific link address does not exist in the malicious information database,
   accessing a malicious link index database that associates a link address with context words and malicious websites that cite the specific link address;
   obtaining, from the malicious link index database, a number of a specific context word that appears in the malicious websites with the specific link address of the second website; and
   when the number of the specific context words is greater than a second preset value, determining that the second website is of the malicious website type.

* * * * *